(12) United States Patent
Rong et al.

(10) Patent No.: US 10,968,041 B1
(45) Date of Patent: Apr. 6, 2021

(54) HIGH CUT/GOUGE AND ABRASION RESISTANCE CONVEYOR BELT COVER

(71) Applicant: ContiTech Transportbandsysteme GmbH, Hannover (DE)

(72) Inventors: Guangzhuo Rong, Hudson, OH (US); Thomas George Burrowes, North Canton, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 16/906,848

(22) Filed: Jun. 19, 2020

(51) Int. Cl.
*B65G 15/34* (2006.01)
*C08L 9/06* (2006.01)

(52) U.S. Cl.
CPC ............. *B65G 15/34* (2013.01); *C08L 9/06* (2013.01); *C08L 2205/03* (2013.01)

(58) Field of Classification Search
CPC ........ B65G 15/34; B65G 15/32; B65G 15/36; B65G 15/38; B65G 15/40; B65G 15/42; B65G 15/44; B65G 15/46; C08L 9/06; C08L 2205/00
USPC ........................................................ 198/847
See application file for complete search history.

(56) References Cited

U.S. PATENT DOCUMENTS

| | | | |
|---|---|---|---|
| 5,341,863 A | 8/1994 | Sandstrom et al. | |
| 8,910,780 B2 | 12/2014 | Pero et al. | |
| 9,580,249 B2 | 2/2017 | Si et al. | |
| 9,637,312 B2 | 5/2017 | Burrowes et al. | |
| 9,962,906 B1* | 5/2018 | Maguire | B32B 7/06 |
| 10,266,345 B2 | 4/2019 | Rong et al. | |
| 10,364,100 B2 | 7/2019 | Maguire et al. | |
| 2004/0018368 A1 | 1/2004 | Kerstetter et al. | |
| 2004/0065529 A1 | 4/2004 | Cediel et al. | |
| 2006/0148989 A1 | 7/2006 | Burrowes et al. | |
| 2006/0287148 A1 | 12/2006 | Wood et al. | |
| 2008/0116043 A1 | 5/2008 | Chahal et al. | |
| 2010/0190914 A1 | 7/2010 | Burrowes et al. | |
| 2012/0031742 A1 | 2/2012 | Nakano | |
| 2012/0168285 A1 | 7/2012 | Holland et al. | |
| 2014/0021021 A1 | 1/2014 | Pero et al. | |
| 2015/0005433 A1* | 1/2015 | Furuhata | C08K 3/04 524/495 |
| 2015/0034458 A1 | 2/2015 | Burrowes et al. | |
| 2015/0225175 A1 | 8/2015 | Borio et al. | |
| 2016/0137421 A1 | 5/2016 | Josserond et al. | |
| 2016/0152805 A1 | 6/2016 | Jasiunas et al. | |

(Continued)

*Primary Examiner* — Mark A Deuble
(74) *Attorney, Agent, or Firm* — David L. Cate; Gregory Adams

(57) ABSTRACT

A conveyor belt includes a cut and gouge resistant cover layer defining a load carrying surface, a pulley layer disposed parallel to the cover layer, and a carcass comprising one or more reinforcement layers, where the carcass is disposed between the cover layer and the pulley layer. The cover layer is formed by curing an admixture including a rubber component, a sulfur curative, and an additive including oxidized high density polyethylene, maleated high density polyethylene, and/or non-functionalized high density polyethylene. The rubber component includes styrene-butadiene rubber and natural rubber. The cut and gouge resistant cover layer has a cut resistance and gouge resistance value of 1.00 grams or less, after the admixture is cured, and the cut and gouge resistant cover layer has an abrasion resistance of value of 110 or less after the admixture is cured.

20 Claims, 2 Drawing Sheets

(56) References Cited

U.S. PATENT DOCUMENTS

| | | |
|---|---|---|
| 2016/0272793 A1 | 9/2016 | Bedard et al. |
| 2017/0190511 A1 | 7/2017 | Takahashi et al. |
| 2018/0222678 A1 | 8/2018 | Rong et al. |
| 2019/0291957 A1 | 9/2019 | Henning et al. |
| 2019/0359810 A1* | 11/2019 | Xu ................... B65G 15/32 |
| 2019/0375873 A1* | 12/2019 | Shinke ............... C08L 15/00 |
| 2020/0087489 A1 | 3/2020 | Isitman et al. |
| 2021/0009722 A1* | 1/2021 | Lee .................... C08F 12/08 |

* cited by examiner

HIGH CUT/GOUGE AND ABRASION RESISTANCE CONVEYOR BELT COVER

FIELD

The field to which the disclosure generally relates is rubber articles with high cut resistance, high gouge resistance and high abrasion resistance, as well as methods of manufacturing such rubber articles.

BACKGROUND

This section provides background information to facilitate a better understanding of the various aspects of the disclosure. It should be understood that the statements in this section of this document are to be read in this light, and not as admissions of prior art.

Amongst currently available conventional conveyor belts, there are no single conveyor belts having cover compounds that can simultaneously provide both exceptional cut/gouge resistance and exceptional abrasion resistance. Two different types of cover compounds are typically used to provide, on the one hand good cut/gouge resistance, or on the other hand another type for good abrasion resistance. Certain conveyor belts applications require exceptional cut/gouge resistance and exceptional abrasion resistance characteristics for effective operation, and good belt service life. However, the user has to choose between exceptional cut/gouge resistance or exceptional abrasion resistance characteristics. In addition, the present situation complicates inventory and product management as several types of belts must always be made available.

Thus, there is an ongoing need for rubber articles, such as conveyor belts, formed of materials which provide exceptional cut/gouge resistance and exceptional abrasion resistance, such need met, at least in part, with embodiments according to the following disclosure.

SUMMARY

This section provides a general summary of the disclosure, and is not a necessarily a comprehensive disclosure of its full scope or all of its features.

In a first aspect of the disclosure, a conveyor belt includes a cut and gouge resistant cover layer defining a load carrying surface, a pulley engaging layer disposed parallel to the cover layer, and a carcass comprising one or more reinforcement layers, where the carcass is disposed between the cover layer and the pulley engaging layer. The cut and gouge resistant cover layer is formed by curing an admixture including a rubber component, a sulfur curative, and an additive based upon oxidized high density polyethylene, maleated high density polyethylene, non-functionalized high density polyethylene, or any mixture thereof. The rubber component includes styrene-butadiene rubber and natural rubber, and the admixture is effectively maintained within the cover layer after the admixture is cured and during use of the conveyor belt. The cut and gouge resistant cover layer has a cut resistance and gouge resistance value of 1.00 grams or less, after the admixture is cured, and the cut and gouge resistant cover layer has an abrasion resistance of value of 110 or less after the admixture is cured. In some aspects, the cut and gouge resistant cover layer has a cut resistance and gouge resistance value of 0.95 grams or less, after the admixture is cured, or even a value of 0.90 grams or less, after the admixture is cured. In some cases, the cut and gouge resistant cover layer is devoid of polyethylene polyolefin, devoid of EPDM and/or devoid of a peroxide curative.

In some aspects, the cut and gouge resistant cover layer has an abrasion resistance of value of 100 or less, after the admixture is cured, or even a value of 90 or less, after the admixture is cured.

According to some other aspects, the additive based upon oxidized high density polyethylene, maleated high density polyethylene, non-functionalized high density polyethylene, or any mixture thereof, is incorporated in an amount of from 5% to 80% by weight of the rubber component of the cut and gouge resistant cover layer, or even an amount of from 15% to about 35%, by weight of the rubber component of the cut and gouge resistant cover layer.

In other aspects of the disclosure, rubber article belt includes a cut and gouge resistant cover layer defining a load carrying surface, a pulley engaging layer disposed parallel to the cover layer, and a carcass comprising one or more reinforcement layers, where the carcass is disposed between the cover layer and the pulley engaging layer. The cut and gouge resistant cover layer is formed by curing an admixture including a rubber component, a sulfur curative, and an additive based upon oxidized high density polyethylene, maleated high density polyethylene, non-functionalized high density polyethylene, or any mixture thereof. The rubber component includes styrene-butadiene rubber and natural rubber, and the admixture is effectively maintained within the cover layer after the admixture is cured and during use of the conveyor belt. The cut and gouge resistant cover layer has a cut resistance and gouge resistance value of 1.00 grams or less, after the admixture is cured, and the cut and gouge resistant cover layer has an abrasion resistance of value of 110 or less after the admixture is cured. In some aspects, the cut and gouge resistant cover layer has a cut resistance and gouge resistance value of 0.95 grams or less, after the admixture is cured, or even a value of 0.90 grams or less, after the admixture is cured. In some cases, the cut and gouge resistant cover layer is devoid of polyethylene polyolefin, devoid of EPDM and/or devoid of a peroxide curative. The rubber article may be a conveyor belts, a power transmission belt, a hose, and the like.

In yet other aspects of the disclosure, methods of preparing a conveyor belt include providing a carcass having one or more reinforcement layers, where the carcass defines a first side and an opposing second side. A cut and gouge resistant cover layer is applied to the first side, and the cover layer defines a load carrying surface. A pulley engaging layer is applied to second side. Then the combination of the carcass, the cover layer and the pulley engaging layer, is cured. The cut and gouge resistant cover layer includes an admixture of a rubber component, a sulfur curative, and an additive comprising oxidized high density polyethylene, maleated high density polyethylene, non-functionalized high density polyethylene, or any mixture thereof. The rubber component includes styrene-butadiene rubber and natural rubber. The admixture is effectively maintained within the cover layer after the admixture is cured and during use of the conveyor belt. The cut and gouge resistant cover layer has a cut resistance and gouge resistance value of 1.00 grams or less, after the admixture is cured, and the cut and gouge resistant cover layer has an abrasion resistance of value of 110 or less after the admixture is cured.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
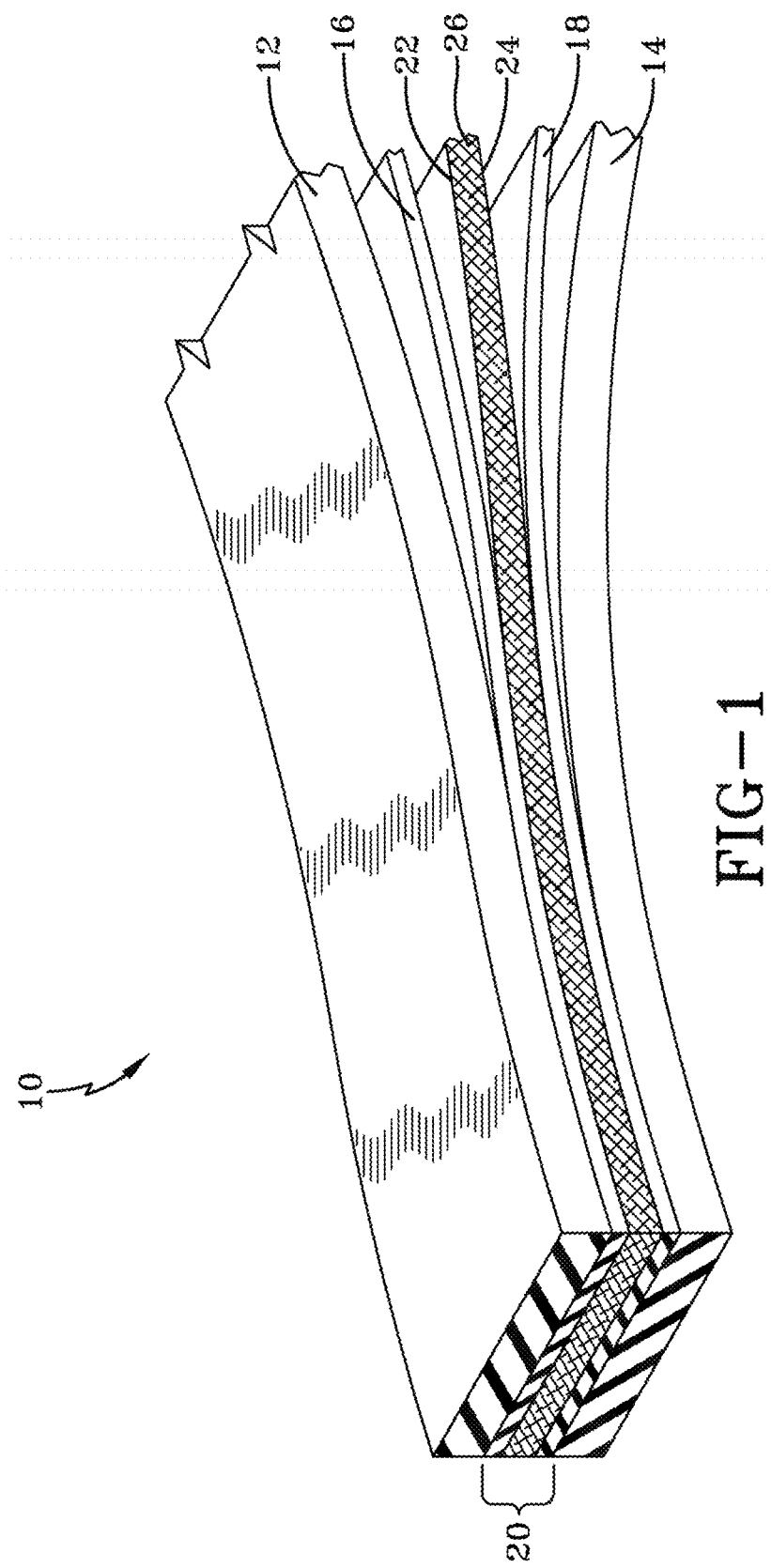
FIG. 1 illustrates in a perspective view, a portion of a conveyor belt where layers are peeled apart, according to an aspect of the disclosure; and, FIG. 2 depicts in a perspective view, a portion of hose where layers are tiered, according to another aspect of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments of the disclosure are rubber articles, such as conveyor belts which include an elastomeric body having a cover layer defining a load carrying surface, a parallel pulley engaging layer, and a reinforcement layer, which may contain layered fabrics or single layer of parallel steel cables, and which is part of a carcass disposed within the elastomeric body of the belt. The cover layer incorporates an effective level of oxidized high density polyethylene and/or maleated high density polyethylene, and/or non-functionalized high density polyethylene additive, along with styrene-butadiene rubber (SBR) and natural rubber, when, after curing (vulcanization) with a sulfur based curative, provides significantly improved cut and gouge resistance, in comparison with conventional conveyor belt cover layers. In addition to the cut and gouge resistant cover layer, which defines a load carrying surface, the conveyor belts also include a pulley engaging layer disposed parallel to the cover layer, and a carcass comprising one or more reinforcement layers, the carcass disposed between the cover layer and the pulley engaging layer.

In some aspects, the cut and gouge resistant cover layer is formed by curing an admixture including a rubber component and a sulfur based curative, where the rubber component includes styrene-butadiene rubber, natural rubber, and an additive which is a oxidized high density polyethylene or/and maleated high density polyethylene and/or non-functionalized high density polyethylene, and the cured admixture is effectively maintained within the cover layer during use of the conveyor belt. In some aspects, the cut and gouge resistant cover layer is devoid of polyethylene polyolefin and/or EPDM. The admixture enables high ultimate elongation with increased hardness and increased hysteresis, which are characteristics of a compound with high cut resistance. In addition, the admixture containing the oxidized high density polyethylene or/and maleated high density polyethylene and/or non-functionalized high density polyethylene additive also enhances the abrasion resistance of the compound.

Inventors surprisingly find that compounds described above combine both good cut and gouge resistance while maintaining good abrasion resistance. Users of the conveyor belts require these characteristics for effective operation and good belt service life. In addition, embodiments of the disclosure overcome complications regarding users' inventory and product management, as several types of belts typically must always be available. Furthermore, embodiments according to the disclosure are conveyor belts simultaneously providing exceptional cut and gouge resistance as well as exceptional abrasion resistance. The embodiments of the disclosure remedy the 'trade-off' often made by users, between cut/gouge resistance and abrasion resistance for rubber based compounds (without added thermoplastic), by providing a single compound combining all characteristics.

In some aspects, the cover layer may or may not contain polyethylene polyolefin, which may be copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. In some cases, when EPDM is utilized, the unsaturated component of EPDM may be any appropriate non-conjugated diene may be used, including for example, 1,4-hexadiene (HD), dicyclopentadiene (DCPD) or ethylidenenorbornene (ENB). The ethylene-alpha-olefin elastomer may contain from about by 20% by weight to about 90% by weight of the ethylene unit, from about 80% weight to about 10% by weight of the propylene or octene unit, and 0 to about 10% by weight of the unsaturated component. In an embodiment, the ethylene-alpha-olefin elastomer contains from about 45% to about 78% by weight of the ethylene unit, or even from about 50% to about 75% of the ethylene unit. In some aspects, a blend of polyethylene polyolefins is used. At these ethylene unit content levels, endless belts and other rubber products incorporating as their outer layer portions the ethylene-alpha-olefin elastomeric compositions exhibit improved anti-stick, and/or easy release characteristics.

For purposes of this disclosure, the "total crosslinkable material" in the compositions is used as the basis for the "parts per hundred rubber" (phr) calculation. The amount of oxidized high density polyethylene or/and maleated high density polyethylene and/or non-functionalized high density polyethylene additive based upon the phr of crosslinkable styrene-butadiene rubber (SBR) and natural rubber. Crosslinkable material is herein defined as a material in a composition that chemically links with other material within the composition. For the purpose of this definition, co-agents and curatives, such as sulfur based curatives, peroxide, zinc methacrylate, zinc diacrylate, bis-maleimide, and/or vulcanizate are not considered cross-linkable materials. Crosslinkable materials include conventional solid elastomers, liquid elastomers, and cross-linkable thermoplastic resins or waxes.

Any of a variety of natural or synthetic elastomeric materials suitable for conveyor belt applications may, or may not, be used to form the pulley engaging layer, and optional intermediate layer(s), including, but not limited to those material described in as used in belts disclosed in U.S. Pat. No. 8,910,780 B2, which is incorporated herein by reference thereto. A non-limiting list of exemplary materials includes chloro-sulfonyl-polyethylene, natural rubber, chloroprene, nitrile-butadiene rubber, butadiene rubber, isoprene, styrene-butadiene, modified polysiloxanes, polyester urethane, polyether urethane, polyvinyl chloride, fluorocarbon polymers, polyolefin, such as polyethylene or polypropylene, and the like.

The elastomeric materials used in forming conveyor belts in accordance with the disclosure may also include additives for enhancing flame retardancy, wear and chunk resistance, rolling resistance, aging resistance (e.g., ozone and UV resistance), and the like. Vulcanization aids, cross-linking agents, silicone oils, slip agents, accelerators, or other formation aids may also be used.

In accordance with the disclosure, a layer in which the additive is incorporated, include the oxidized high density polyethylene or/and maleated high density polyethylene and/or non-functionalized high density polyethylene additive in an amount of about 1% to about 99%, about 5% to about 95%, about 5 to about 80%, about 15% to about 70%, or even about 15% to about 35%, by weight. When used, oxidized polyethylene materials suitable for use in the practice of some embodiments of the disclosure are described in U.S. Pat. Nos. 2,683,141, 3,060,163 and 9,962,906, which are incorporated herein by reference.

The compositions useful in forming the cover layers in some embodiments of the disclosure may further include from about 1 to about 250 phr, or even from about 10 to about 70 phr, of fillers such as carbon black, calcium carbonate, talc, clay or hydrated silica, or mixtures of the foregoing. Other conventional polyethylene polyolefin elastomer additives, process and extender oils, antioxidants, waxes, pigments, plasticizers, softeners and the like may be added according to common rubber processing practice without departing from the disclosure. For example, in some embodiments, the elastomeric composition also contains from about 1.5 to about 4.5 phr of an antiozonant and/or antioxidant.

The admixtures including the styrene-butadiene rubber, natural rubber, and oxidized high density polyethylene or/and maleated high density polyethylene and/or non-functionalized high density polyethylene additive containing compositions may be prepared by any conventional procedure such as for example, by mixing and milling the ingredients in an internal mixer or mill.

According to some aspects of the disclosure, cover layers of rubber products include, prior to curing, styrene-butadiene rubber in an amount of from about 80 phr to about 95 phr, natural rubber in an amount of from about 20 phr to about 5 phr, the oxidized high density polyethylene or/and maleated high density polyethylene and/or non-functionalized high density polyethylene additive, and carbon black in amount of from about 5 phr to about 100 phr, or even 15 phr to 60 phr.

Some rubber articles utilizing the admixtures including the styrene-butadiene rubber, natural rubber, and oxidized high density polyethylene or/and maleated high density polyethylene and/or non-functionalized high density polyethylene additive in outer or cover layers, such as conveyor belts, power transmission belts, hoses, and the like, may further include a central reinforcing layer, which may be formed from any of a variety of materials, either woven or non-woven, spiraled, braided, and the like, in any desirable weight and orientation. In some cases, the reinforcing layer may be comprised of multiple individual plies separated by appropriate elastomeric or adhesive layers. Such materials may include a wide variety of synthetic and manmade fibers, including polyester, nylon, steel, aramid (e.g., Kevlar), glass, polypropylene, cellulose, wool, or others. The fibers may be multi-filament, monofilament, or staple fibers. In some embodiments, the central reinforcing layer includes multiple plies of polyester and/or nylon and/or blended woven fabrics. In some aspects, steel cable or cord may be used in the reinforcement.

In some aspects, the multiple plies are formed from fabrics continuously impregnated with a bonding agent in plastisol to form coated fabric material or with an adhesive rubber compound. In some cases, the fabric utilized may be comprised of cotton, a polyester, a nylon, or a blend thereof. For example, the polyester can be polyethylene terephthalate or polyethylene naphthalate. In some cases, the polyester can be a copolyester that contains repeat units, which are derived from both terephthalic acid and isophthalic acid or dimethyl esters thereof. In such cases, the copolyester will typically contain at least about 95 weight percent terephthalic acid and up to about 5 weight percent isophthalic acid. More typically, the copolyester will contain at least about 97 weight percent terephthalic acid and up to about 3 weight percent isophthalic acid. The polyester fabric can optionally be made from polyester staple yarn to improve adhesion characteristics. The nylon fabrics that can be used in conjunction with this disclosure may be comprised of virtually any type of nylon, such as nylon-6,6, nylon-6,12, nylon-6,10, nylon-6,9, nylon-6, nylon-11, or nylon-12. For commercial reasons, the nylon will typically be nylon-6,6 or nylon- 6. In any case, where used, the fabric material will typically be a woven fabric, although non-woven fabrics may be useful as well.

In some other embodiments of the disclosure, the reinforcement layer is disposed in a carcass disposed and the cover layer and the pulley engaging layer of a convey belt. The reinforcement layer may be formed of the materials described above as well as other suitable materials. In some aspects, steel cords, brass cords, brass plated steel cords, zinc coated steel cords, other metal cords, or mixtures thereof are used as reinforcement components of the reinforcement layer.

Now with reference to FIG. 1, in an aspect of the disclosure, a conveyor belt 10 includes cover layer 12 and pulley engaging layer 14. The cover layer 12 is formed by curing an admixture of the styrene-butadiene rubber and natural rubber, and further including the oxidized high density polyethylene or/and maleated high density polyethylene and/or non-functionalized high density polyethylene additive, and may include other suitable materials used in cover layers. Pulley engaging layer 14 may be based upon any of a variety of natural or synthetic elastomeric materials, as well as other suitable materials used in pulley engaging layers. Such layers 12 and 14 may be attached in some cases to optional first and second skim layers 16 and 18, respectively, of reinforcement layer 20, which is situated between layers 12, 14. Outer first and second skim layers 16, 18 coat opposing surfaces 22 and 24 of reinforcing material 26 which together define reinforcement layer 20. In some aspects, the textile material may be, for example, a polyester/polyamide fabric, a polyester/polyester fabric, or a polyamide/polyamide fabric. Other materials may be substituted for, or combined with, the textile material 26, such as metal cords or wires (i.e. steel, brass or zinc coated, for example). As understood by one having ordinary skill in the art, multiple reinforcement layers 20 may be included with skim layers 16, 18, respectively, on opposing surfaces 22, 24 thereof. In an aspect of the disclosure, reinforcement layer 20 is the carcass.

The conveyor belt 10, may be assembled initially by applying the first and second skim layers 16, 18 to the opposing surfaces 22, 24 of the reinforcement material (or metal) 26 of reinforcement layer 20 by calendaring as known in the art. Next, cover layer 12 and pulley engaging layer 14 may be simultaneously (or sequentially) applied to the reinforcement layer 20 by calendering the materials forming cover layer 12 and pulley engaging layer 14 onto the respective surfaces of reinforcement layer 20. The resulting product is an unfinished, i.e., uncured, conveyor belt. Once assembled, the conveyor belt is then guided through a curing press at sufficient time, temperature and pressure. The cured conveyor belt 10 may then be cut to desired lengths for use in underground mining facilities or other material transport applications.

Figure 2:
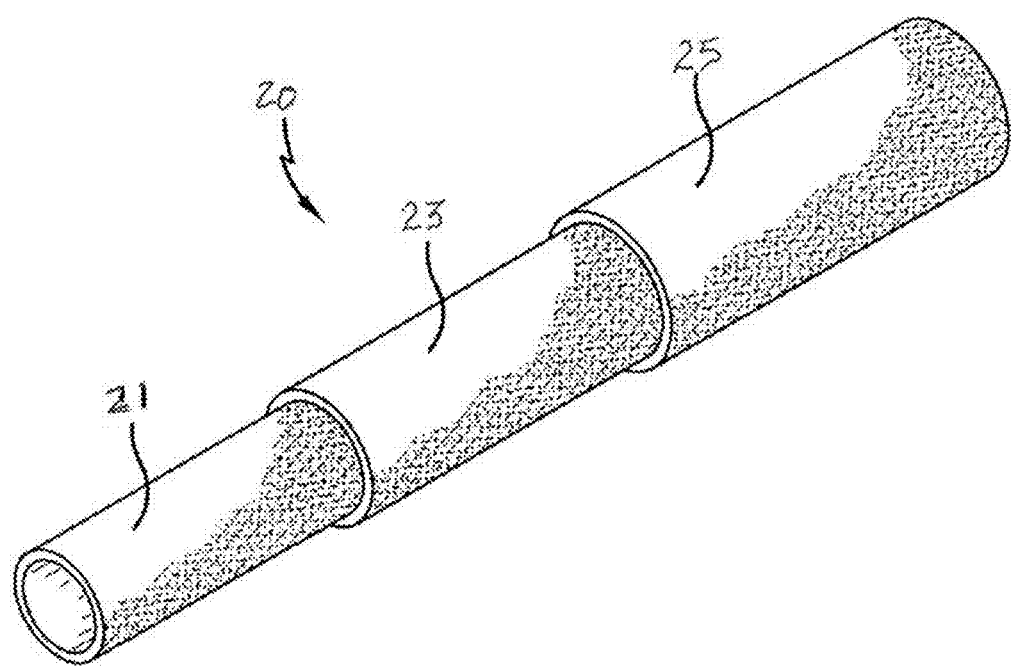

With reference to FIG. 2, in another aspect of the disclosure, a hose 10 constructed according to the disclosure is shown. The hose 10 includes an optional inner layer 21, a reinforcement layer 23 overlaying, and in some cases adhered to, the inner layer 21. Hose 10 further includes an outer cover layer 25 overlaying, and in some cases adhered to, the reinforcement layer 23. The cover layer 25 is formed by curing an admixture of the styrene-butadiene rubber and natural rubber, and further including the oxidized high density polyethylene or/and maleated high density polyethylene and/or non-functionalized high density polyethylene additive. The additive provides advantage over use of a state of the art vulcanized-on plastic film.

The reinforcement layer 23 is formed of a suitable reinforcement material which may include organic or inorganic fibers, steel wires, or brass-plated steel wires, and the like. The reinforcement material may be an organic fiber material, such as nylon, polyester, aramid, cotton or rayon. The reinforcement construction may be of any suitable type such as braid, spiral, knit or wrapped, but in the embodiment shown, is of a braid construction. The reinforcement may further be treated with a sizing such as an RFL-type treatment to promote adhesion between the reinforcement and the inner and outer layers. Where used, the inner layer 11 may consist of single elastomeric layers, or even multiple elastomeric layers which may or may not be of the same composition Other embodiments may be envisioned, including hose constructions having multiple reinforcement layers and multiple elastomeric layers. One or more of the elastomeric layers may comprise the compositions and construction according to the disclosure.

In addition to those hose and conveyor belt embodiments described hereinabove, any other types of rubber articles having a cover layer formed by curing an admixture of styrene-butadiene rubber, natural rubber, and an additive based upon oxidized high density polyethylene, maleated high density polyethylene, non-functionalized high density polyethylene, or any mixture thereof, are within the scope of this disclosure.

Examples

The following experimental data was generated for the purpose of further illustrating the nature of some of the embodiments and aspects of the disclosure, and are not intended as a limitation on the scope thereof. The following examples were prepared to illustrate improved cut/gouge and abrasion belt properties in accordance with some aspects of the disclosure.

In the following examples, in a first pass, a non-productive blend of components was mixed in an internal mixer as indicated in the tables. The non-productive batch was dropped at a temperature of from about 300 deg F. to about 320 deg F. Thereafter, in a second pass, additional components were added to non-productive blend to form a product blend by mixing in an internal mixer. The productive batch was dropped at a temperature of from about 210 deg F. to about 230 deg F. Ingredients used for these examples, comparative example 1 (comp. ex. 1), as well as example 2, are provided in table 1. All values provided in table 1 are presented in phr (per hundred rubber) amounts.

TABLE 1

| Ingredient | comp. ex. 1 | ex. 2 |
| --- | --- | --- |
| Non-productive blend | | |
| Natural rubber | 15 | 15 |
| SBR 1502[1] | 85 | 85 |
| Maleic Anhydride Modified HDPE[2] | | 20 |
| Carbon black N220 | 60 | 60 |
| Neville LX-782 hydrocarbon tackifier | 10 | 10 |
| Microcrystalline wax | 0.67 | 0.67 |
| Paraffinic wax | 0.33 | 0.33 |
| 6PPD antiozonant | 3 | 3 |
| Struktol 40MS processing aid | 5 | 5 |
| Zinc Oxide | 3 | 3 |
| Polystay 100 antioxidant | 1 | 1 |
| TMQ antioxidant | 2 | 2 |
| Stearic acid | 1 | 1 |

TABLE 1-continued

| Ingredient | comp. ex. 1 | ex. 2 |
|---|---|---|
| Productive blend | | |
| Sulfur | 0.9 | 0.9 |
| TBBS accelerator | 1.29 | 1.29 |
| DPG accelerator | 0.89 | 0.89 |
| PVI retarder | 0.3 | 0.3 |

[1]SBR 1502 Elastomer available from Lion Elastomers
[2]KK-10-MAH Maleic Anhydride Modified HDPE available from Adell Plastics The productive blends were then formed into 2 mm thick sheets, and cured at temperature of about 302 deg F. for 30 minutes. Physical property testing was conducted on the cured example sheets or uncured examples, with values indicated in tables 2 below. Mooney scorch was conducted on a Mooney rheometer (small rotor) for uncured examples, Mooney viscosity conducted on a Mooney rheometer (large rotor) for uncured examples, and Rheometer tests conducted using a moving die rheometer for uncured examples. Tensile strength, elongation and Shore A Hardness were performed on cured example sheets according to ASTM D412. Die B Tear was performed on cured example sheets according to ASTM D624, and DIN Abrasion performed on cured example sheets according to ASTM D5963.

The puncture test was performed on cured example blocks according to an in-house test procedure. The puncture test includes using a sharp puncture knife connected to a tensile machine fixture. Under compression mode, the puncture knife pierced a 2.54 cm thickness rubber sample to a depth of 1.9 cm at a speed of 10 cm/minute. Then, the max puncture load was recorded.

The BF Goodrich Cut & Chip test was performed using a BF Goodrich cut and chip tester manufactured by Tech Pro Inc. An annulus test piece was prepared which was 5.08 cm in diameter and 1.27 cm wide, and had a 1.27 cm concentric hole at the center. The test piece was then mounted on the rotating shaft of the BF Goodrich cut/chip tester. During the testing cycle, the test piece was impacted by a tungsten carbide knife with a precision edge. The sample speed was set at 750 rpm and cut/chip cycle was set at 60 rpm. After 10 minutes cut/chip cycle testing, the weight loss of the test piece was recorded.

TABLE 2

| Test Performed | comp. ex. 1 | ex. 2 |
|---|---|---|
| Specific Gravity: | 1.1316 | 1.1113 |
| Mooney Scorch (30/250F) | | |
| ML | 27.5 | 40.1 |
| t5 | | |
| Rheometer (45/302F) | | |
| Min | 3.893 | 4.411 |
| Max | 18.41 | 16.87 |
| Tris1 | 10.18 | 9.78 |
| T25 | 12.16 | 11.67 |
| S25 | 7.517 | 7.522 |
| T90 | 20.05 | 21.51 |
| S90 | 16.97 | 15.64 |
| Rate | 2.5 | 1.9 |
| Amount | 14.51 | 12.46 |
| Original Physical Properties | | |
| Tensile, psi | 2552 | 2703 |
| Elongation, % | 787 | 763 |
| Mod 100, psi | 235 | 523 |
| Mod 300, psi | 729 | 1156 |

TABLE 2-continued

| Test Performed | comp. ex. 1 | ex. 2 |
|---|---|---|
| Shore A Hardness | 62 | 73 |
| Tear Test - Original | | |
| Die B Tear, lbf/inch | 515 | 537 |
| DIN Result | 134 | 95 |
| Puncture test, N | 398 | 656 |
| BFGoodrich cut & chip test | | |
| Weight loss (gram) | 1.249 | 0.862 |

As shown in the examples, use of a sulfur cured blend of styrene-butadiene rubber and natural rubber, and further including the oxidized high density polyethylene or/and maleated high density polyethylene and/or non-functionalized high density polyethylene additive, provides a conveyor belt cover layer with exceptional cut resistance, exceptional gouge resistance and exceptional abrasion resistance. Generally, the sulfur cured blends may have a cut resistance and gouge resistance value of 1.00 grams or less, 0.95 grams or less, 0.90 grams or less, or even 0.85 grams or less, according to the BFGoodrich Cut & Chip test. Incorporated herein by reference thereto. Furthermore, the sulfur cured blends may have an abrasion resistance of value of 110 or less, 100 or less, 95 or less, or even 90 or less, in DIN Abrasion testing performed on cured example buttons according to ASTM D5963.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A conveyor belt comprising:
   a cut and gouge resistant cover layer defining a load carrying surface;
   a pulley engaging layer disposed parallel to the cover layer; and,
   a carcass comprising one or more reinforcement layers, the carcass disposed between the cover layer and the pulley engaging layer;
   wherein the cut and gouge resistant cover layer is formed by curing an admixture comprising a rubber component, a sulfur curative, and an additive comprising oxidized high density polyethylene, maleated high density polyethylene, non-functionalized high density polyethylene, or any mixture thereof;
   wherein the rubber component consists of styrene-butadiene rubber and natural rubber;
   wherein the admixture is effectively maintained within the cover layer after the admixture is cured and during use of the conveyor belt;
   wherein the cut and gouge resistant cover layer has a cut resistance and gouge resistance value of 1.00 grams or less, after the admixture is cured; and,
   wherein the cut and gouge resistant cover layer has an abrasion resistance of value of 110 or less after the admixture is cured.

2. The conveyor belt according to claim 1, wherein the cut and gouge resistant cover layer has a cut resistance and gouge resistance value of 0.95 grams or less, after the admixture is cured.

3. The conveyor belt according to claim 2, wherein the cut and gouge resistant cover layer has a cut resistance and gouge resistance value of 0.90 grams or less, after the admixture is cured.

4. The conveyor belt according to claim 1, wherein the cut and gouge resistant cover layer has an abrasion resistance of value of 100 or less, after the admixture is cured.

5. The conveyor belt according to claim 4, wherein the cut and gouge resistant cover layer has an abrasion resistance of value of 90 or less, after the admixture is cured.

6. The conveyor belt according to claim 1, wherein the additive comprising oxidized high density polyethylene, maleated high density polyethylene, non-functionalized high density polyethylene, or any mixture thereof, is incorporated in an amount of from 5% to 80% by weight of the rubber component of the cut and gouge resistant cover layer.

7. The conveyor belt according to claim 6, wherein the additive comprising oxidized high density polyethylene, maleated high density polyethylene, non-functionalized high density polyethylene, or any mixture thereof, is incorporated in an amount of from 15% to about 35%, by weight of the rubber component of the cut and gouge resistant cover layer.

8. The conveyor belt according to claim 1, provided the cut and gouge resistant cover layer is devoid of polyethylene polyolefin.

9. The conveyor belt according to claim 8, provided the cut and gouge resistant cover layer is devoid of EPDM and devoid of a peroxide curative.

10. A rubber article comprising a cut and gouge resistant cover layer defining a load carrying surface;
    wherein the cut and gouge resistant cover layer is formed by curing an admixture comprising a rubber component, a sulfur curative, and an additive comprising oxidized high density polyethylene, maleated high density polyethylene, non-functionalized high density polyethylene, or any mixture thereof;
    wherein the admixture is effectively maintained within the cover layer after the admixture is cured and during use of the conveyor belt;
    wherein the cut and gouge resistant cover layer has a cut resistance and gouge resistance value of 1.00 grams or less, after the admixture is cured; and,
    wherein the cut and gouge resistant cover layer has an abrasion resistance of value of 110 or less after the admixture is cured.

11. The rubber article according to claim 10, wherein the cut and gouge resistant cover layer has a cut resistance and gouge resistance value of 0.95 grams or less, after the admixture is cured.

12. The rubber article according to claim 11, wherein the cut and gouge resistant cover layer has a cut resistance and gouge resistance value of 0.90 grams or less, after the admixture is cured.

13. The rubber article according to claim 10, wherein the cut and gouge resistant cover layer has an abrasion resistance of value of 100 or less, after the admixture is cured.

14. The rubber article according to claim 13, wherein the cut and gouge resistant cover layer has an abrasion resistance of value of 90 or less, after the admixture is cured.

15. The rubber article according to claim 10, wherein the additive comprising oxidized high density polyethylene, maleated high density polyethylene, non-functionalized high density polyethylene, or any mixture thereof, is incorporated in an amount of from 5% to 80% by weight of the rubber component of the cut and gouge resistant cover layer.

16. The rubber article according to claim 15, wherein the additive comprising oxidized high density polyethylene, maleated high density polyethylene, non-functionalized high density polyethylene, or any mixture thereof, is incorporated in an amount of from 15% to about 35%, by weight of the rubber component of the cut and gouge resistant cover layer.

17. The rubber article according to claim 10, provided the cut and gouge resistant cover layer is devoid of polyethylene polyolefin.

18. The rubber article according to claim 10, provided the cut and gouge resistant cover layer is devoid of EPDM and devoid of a peroxide curative.

19. A method of preparing a conveyor belt, the method comprising:
provided a carcass comprising one or more reinforcement layers, the carcass defining a first side and an opposing second side;
applying a cut and gouge resistant cover layer to the first side, the cover layer defining a load carrying surface;
applying a pulley engaging layer to the second side; and,
curing the combination of the carcass, the cover layer and the pulley engaging layer;
wherein the cut and gouge resistant cover layer is formed by curing an admixture comprising a rubber component, a sulfur curative, and an additive comprising oxidized high density polyethylene, maleated high density polyethylene, non-functionalized high density polyethylene, or any mixture thereof;
wherein the rubber component consists of styrene-butadiene rubber and natural rubber;
wherein the admixture is effectively maintained within the cover layer after the admixture is cured and during use of the conveyor belt;
wherein the cut and gouge resistant cover layer has a cut resistance and gouge resistance value of 1.00 grams or less, after the admixture is cured; and,
wherein the cut and gouge resistant cover layer has an abrasion resistance of value of 110 or less after the admixture is cured.

20. The method according to claim 19, wherein the cut and gouge resistant cover layer has a cut resistance and gouge resistance value of 0.90 grams or less, after the admixture is cured.

* * * * *